United States Patent [19]
Backaus et al.

[11] Patent Number: 5,459,779
[45] Date of Patent: Oct. 17, 1995

[54] METHOD FOR SWITCHING TELEPHONE CALLS TO INFORMATION SERVICE PROVIDERS

[75] Inventors: Marjorie S. Backaus, Morristown; John J. Butz, Eatontown; Ali M. Cherchali, Jackson; Esther L. Davenport, Holmdel; Harold Fahrer, Denville; Kathleen A. Misdea, Metuchen; Robert Petrelli, East Brunswick, all of N.J.

[73] Assignee: AT&T IPM Corp., Coral Gables, Fla.

[21] Appl. No.: 201,867

[22] Filed: Feb. 25, 1994

[51] Int. Cl.⁶ .................................................. H04M 3/58
[52] U.S. Cl. .......................... 379/201; 379/207; 379/211; 379/212; 379/88
[58] Field of Search ............................ 379/88, 201, 207, 379/212, 220, 221, 258, 210, 211, 277, 112, 265, 266, 67

[56] References Cited

U.S. PATENT DOCUMENTS

| | | | |
|---|---|---|---|
| 4,191,860 | 3/1980 | Weber | 379/277 |
| 5,136,636 | 8/1992 | Wegrzynowicz | 379/201 |
| 5,181,238 | 1/1993 | Medamana et al. | 379/88 |
| 5,187,735 | 2/1993 | Garcia et al. | 379/88 |

Primary Examiner—Jeffery A. Hofsass
Assistant Examiner—Scott Wolinsky
Attorney, Agent, or Firm—Gerard A. deBlasi; Gregory C. Ranieri

[57] ABSTRACT

Telephone calls are directed from a first telecommunications platform to a second telecommunications platform, together with an identifier which uniquely identifies the call and enables telecommunication switches to monitor and maintain control over the call. The unique identifier enables the call to be returned from the second platform to the first platform. Once returned to the first platform, the call can be directed to a third telecommunications platform (and, subsequently, back to the first platform), without requiring the caller to place another call or to re-verify the caller's identity. The call identifier is used either to automatically return the call to the first platform after the occurrence of a predetermined event, or upon detecting predetermined, caller-dialed keystrokes indicating that the caller wishes to return to the interexchange carrier platform.

16 Claims, 1 Drawing Sheet

METHOD FOR SWITCHING TELEPHONE CALLS TO INFORMATION SERVICE PROVIDERS

TECHNICAL FIELD

This invention relates to information services systems and, more particularly, to switching calls within a telecommunications network or between a telecommunications network and privately-owned information services systems.

BACKGROUND OF THE INVENTION

Information services systems are currently available which permit a caller to obtain information by telephone about various topics, such as weather, sports, and stock prices. Typically, the caller contacts the information service provider by dialing the information service provider's telephone number. Alternatively, the caller may first call into a telecommunications platform, such as the platform of an inter-exchange carrier (IXC), and then transfers to the information service provider's platform. In both instances, the caller, once connected to the information service provider's platform, cannot get back to the interexchange carrier platform so as to access the facilities of a second information service provider. For example, if a caller wishes to obtain weather information from a first information service provider and sports information from a second information provider, the caller must make two separate calls. Such a system typically may require entry of personal identification numbers (PINs) when accessing each information service system, and results in unnecessary expense, inconvenience, and delay to the caller.

SUMMARY OF THE INVENTION

Calls are directed from a first telecommunications platform to a second telecommunications platform, together with an identifier which uniquely identifies the call. The unique identifier enables telecommunication switches to monitor and maintain control over the call, and enables the call to be returned from the second platform to the first platform. Once returned to the first telecommunications platform, the call can be directed to a third telecommunications platform, without requiring the caller to place a second call or to re-verify the caller's identity. In addition, the principles of the invention are applicable to regulated telecommunications transport.

In an exemplary embodiment of the invention, calls are directed from the platform of an interexchange carrier (or local exchange carrier) to the platform of an information service provider. A unique call identifier, for example, a special services telephone number or access code which uniquely identifies a telephone service account (or which is unique to the caller), is sent to the information service provider's platform as part of the messaging for switching the call. The call identifier is used to automatically return the call to the interexchange carrier's platform when the session with the information service provider's platform has ended. The interexchange carrier's platform also uses the call identifier to monitor the transferred call for specific caller-dialed keystrokes indicating that the caller wishes to return from the information service provider's platform to the interexchange carrier platform. Once returned to the interexchange carrier platform, the caller may use the services of the interexchange carrier's platform or access another information service provider's platform.

DETAILED DESCRIPTION

Figure 1:
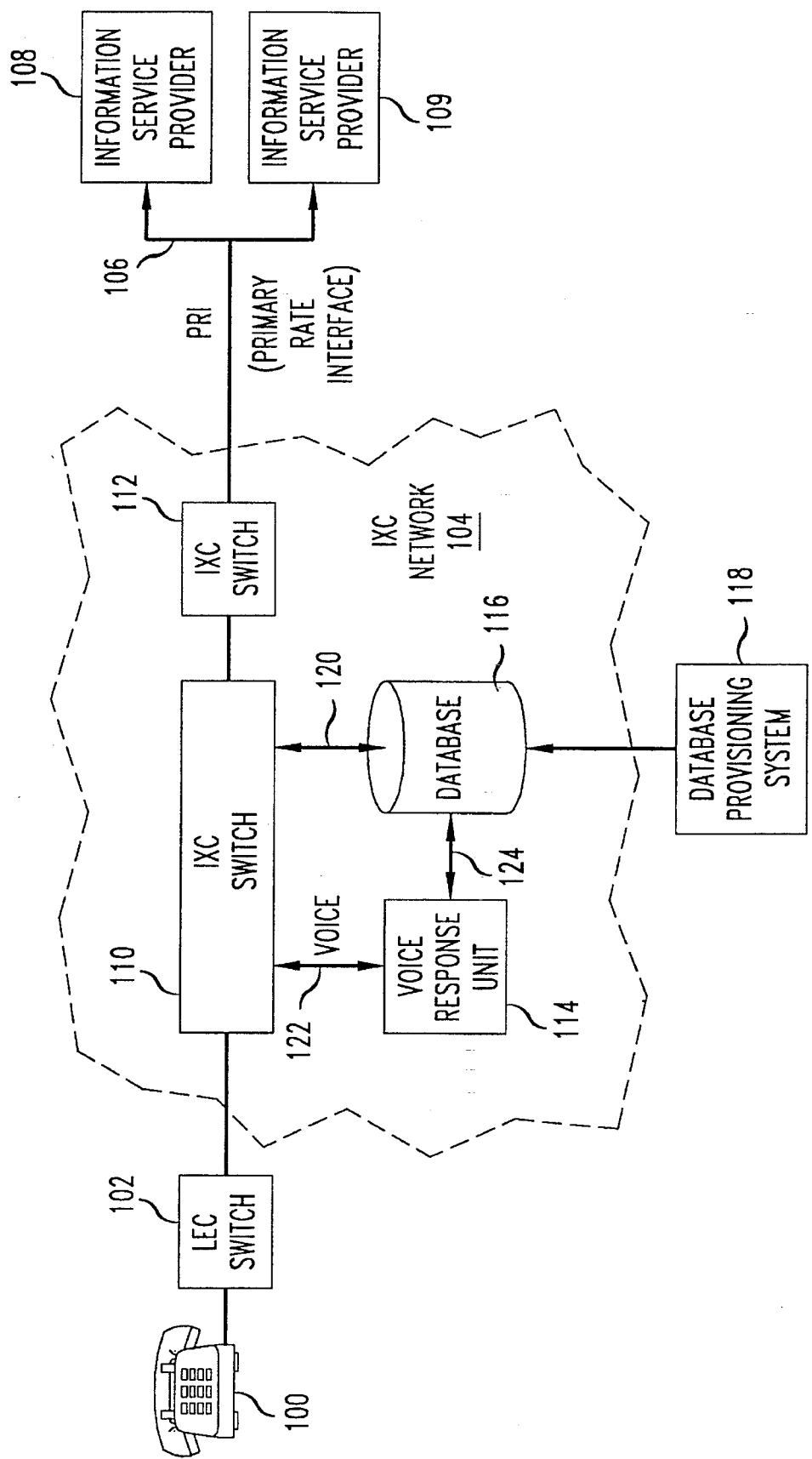
FIG. 1 is a block diagram of a portion of a telecommunications system suitable for use with the present invention.

FIG. 1 shows a portion of an exemplary telecommunications network suitable for use with the present invention. The telecommunications network includes a telephone station 100, a local exchange carrier (LEC) switch 102, an interexchange carrier (IXC) switched network 104, and a primary rate interface 106 which connects IXC network 104 to information service providers 108 and 109. IXC network 104 includes IXC switches 110 and 112 (also referred to as the "originating IXC switch" and "terminating IXC switch," respectively), a voice response unit (VRU) 114, and a database 116. A database provisioning system 118 is provided to update customer (caller) records within database 116 with, for example, information about various information service providers. One skilled in the art will appreciate that other network elements, such as additional IXC switches disposed in the call path between IXC switches 110 and 112, may be used without departing from the scope of the invention.

A call placed by a calling party from telephone station 100 is extended to LEC switch 102 and then switched to IXC switch 110. The call is established between telephone station 100 and IXC switched network 104 on conventional telephone circuits using Common Channel Signal Number 7 (CCS7) signaling. One skilled in the art will appreciate that the call can be routed directly to IXC switch 110 without passing through a LEC switch, and that other means, such as cellular and other wireless networks, can be used to connect the caller at telephone station 100 to IXC switch 110. The interface between IXC switched network 104 and information service providers 108 and 109 illustratively is a "800 MegaCom Info 2" interface, offered by American Telephone & Telegraph Co. (AT&T). As described below, calls switched between IXC switched network 104 and information service providers 108 and 109 are transmitted on primary rate interface (PRI) Integrated Services Digital Networks (ISDN) channels 106, which illustratively comprise 23 ISDN B-channels and one ISDN D-channel.

In an illustrative embodiment of the invention, which is described in greater detail below, the caller at telephone station 100 gains access first to an IXC (or LEC) telecommunications platform, and is subsequently transferred to the platform of an information service provider. A call identifier which uniquely identifies a telephone service account, such as the caller's AT&T Easy Reach[SM] account, is sent to the information service provider's platform (represented, for example, by reference number 108 of FIG. 1) as part of the messaging for switching the call. The call identifier provides the IXC platform with a means for monitoring and retaining control over the call so that the call can be returned from the information service provider's platform to the IXC platform.

To illustrate the features of the present invention, consider a system in which the caller gains access to an IXC platform, such as the AT&T Easy Reach[SM] 700 platform, by dialing the caller's Easy Reach[SM] 700 telephone number. Referring to FIG. 1, the call is routed from telephone station 100 to originating IXC switch 110. IXC switch 110 sends a data message to database 116 via a connection 120 to obtain call routing instructions. The AT&T Easy Reach[SM] 700 platform software within database 116 validates the caller's Easy Reach<sup>SM</sup> account and requests IXC switch 110 to connect the caller to VRU 114 via a channel 122.

VRU 114, which illustratively is an AT&T Conversant® speech processor, communicates with the caller by "playing" a greeting announcement, then queries the caller for the caller's personal identification number (PIN). The caller enters a PIN by keying selected digits from the keypad of telephone station 100. VRU 114 collects DTMF digits (tones) transmitted by the caller, and re-transmits those digits to database 116 via channel 124 to verify the caller's PIN. Database 116 verifies the PIN and signals VRU 114 with information about features available through the caller's Easy Reach<sup>SM</sup> account.

VRU 114 then offers the caller one or more menu choices. For example, VRU 114 may play a message such as "press '1' to place a call, or press '2' for a list of personal information services." When the caller responds by entering a "2" from the keypad of telephone station 100, VRU 114 responds by playing a list of branded choices for information services. More particularly, the caller is offered a selection of information service providers with which the caller may choose to be connected. For example, the caller may be given three choices: "press '1' for ABC Company's Information Service; press '2' for DEF Company's Information Service; or press '3' for XYZ Company's Information Service." The caller then responds, for example, by pressing a "1" on the keypad of telephone station 100 to select ABC Company's Information Service. It is to be understood that the term "information service provider" as used herein includes not only providers of information (e.g., weather, investment data, sports, news, etc.), but also providers of goods and services, such as concert tickets, sporting event tickets, and general merchandise.

In accordance with the invention, VRU 114 signals IXC switch 110, via database 116, to direct, or "launch," the call to the platform of the caller-selected information service provider. In particular, IXC switch 110 routes the call to IXC switch 112 for routing to a telephone number associated with the service selected by the caller. This may be accomplished, for example, by causing IXC switch 110 to route the call (via IXC switch 112) to a toll free or "800" number associated with the selected information service provider. Methods and apparatus for processing 800 number calls are described in greater detail in U.S. Pat. No. 4,191,860, issued to Weber, entitled, "Data Base Communication Call Processing Method," which is hereby incorporated by reference. IXC switch 112 then routes the call to the information service provider via a PRI trunk group 106 using, for example, Q.931 signaling. The call then leaves the AT&T Easy Reach<sup>SM</sup> platform and is controlled by the selected information service provider's platform (illustratively, the AT&T/USA Today Personalized Services platform). The caller may then access the desired services or information using menus on the information service provider's platform.

When completing the call to the information service provider's 800 number, IXC switch 110 passes a unique identifier to the information service provider's platform so as to uniquely identify the call. In accordance with a feature of the invention, the unique identifier may be the telephone number dialed by the caller to reach the IXC platform. This telephone number preferably is a special services telephone number which is unique to the calling party, such as the calling party's Easy Reach<sup>SM</sup> 700 number. The identifier is passed to the information service provider's platform by causing IXC switch 110 to provide the calling party's Easy Reach<sup>SM</sup> 700 number in place of the dialed 800 number when completing the 800 number call to the information service provider. (The dialed 800 number is dropped once the information service provider's platform has been reached.) Techniques for transmitting the dialed 800 number, the caller's ANI, and the caller's Easy Reach<sup>SM</sup> 700 number to the second platform (i.e., the information service provider's platform), including forming the required signaling messages, are well known in the art.

Using as the call identifier a special services telephone number that is unique to the caller is advantageous because the information service provider can readily determine the identity of the calling party. Also, the process of transferring the call from the first platform (e.g., the IXC platform) to other platforms is transparent to the caller, because no additional identity verification or billing authorization need be performed by the individual information service providers—the verification performed at the first platform is sufficient. This also reduces the call processing expense, and the delay and inconvenience to the caller. Nevertheless, one skilled in the art will appreciate that the call identifier of the invention could be any other convenient identifier which allows the IXC platform to regain control of the call.

Once the call has been launched to an information service provider's platform, data and control information can be passed between telephone station 100 and an information service provider in a conventional manner or as disclosed in commonly-owned, copending U.S. patent application Ser. No. 08/121,124, filed Sep. 14, 1993, entitled "Telephone information Service System Using Digital and Out-Of-Band Signaling," and in commonly-owned, copending U.S. patent application Ser. No. 08/121,123, filed Sep. 14, 1993, entitled "Personalized Information Service System," which are both hereby incorporated by reference.

In accordance with another feature of the invention, the call identifier is used by the first telecommunications platform (e.g., the IXC platform), in conjunction with the information service provider, to provide a "forced return to platform" option and a "back to platform" option to the caller. The "forced return to platform" option causes the call to automatically return to the first platform after the occurrence of a predetermined event, such as the end of a session with a particular information service provider. The call is returned to the first platform rather than simply being terminated altogether. The call may be returned to the first platform immediately, or following a predetermined elapsed period of time ("time-out" period). The "back to platform" option enables the caller to return to the first platform at any time, without waiting for the session with the information service provider to end. In an exemplary embodiment of the invention, the "back to platform" option is made available to the caller only during non-conversation periods of a telephone call, such as during call setup, and is disabled during the period of the telephone call between answer and disconnect. The first platform uses the call identifier to monitor the call (typically in those periods of the call when a voice connection is not established between the caller and the information service provider) for predetermined, caller-dialed keystrokes indicating that the caller wishes to return to the first platform. For example, the call may be transferred back to the first platform upon detecting the DTMF signals "*R" sent by the caller.

It will be apparent to one skilled in the art that other modifications can be made to the described embodiments without departing from the scope of the invention. For example, in addition to sending a unique subscriber identifier during call setup, VRU 114 and IXC switch 110 may also send to the information service providers other information obtained during call setup. For instance, the ANI of telephone station 100 may be sent to the information service provider so that the information service provider can automatically provide the caller with the local weather report for the area in which the call originated. Also, is to be understood that "telephone calls" and "voice" communications are to be construed broadly and may include, for example, multimedia (voice and video) communications.

We claim:

1. A method for transferring a telephone call between first and second telecommunications platforms, the method comprising the steps of:

including with a telephone call transferred from the first telecommunications platform to the second telecommunications platform an identifier which uniquely identifies a telephone service account of a calling party;

returning the telephone call to the first telecommunications platform after an occurrence of a predetermined telephone event; and using the identifier to continue processing of the telephone call at the first telecommunications platform.

2. The method of claim 1 wherein the identifier comprises an automatic number identifier (ANI) of a telephone station from which the telephone call originates.

3. The method of claim 1 wherein the identifier comprises a special services telephone number or access code unique to the calling party.

4. The method of claim 3 wherein the identifier comprises the calling party's Easy Reach$^{SM}$ 700 number.

5. The method of claim 1 wherein the first telecommunications platform comprises one of an interexchange carrier platform and a local exchange carrier platform.

6. The method of claim 1 wherein the second telecommunications platform comprises an information service provider's platform.

7. The method of claim 1 further comprising the steps of:

completing a call to an 800 number associated with the second telecommunications platform; and providing the call identifier to the second telecommunications platform in place of the 800 number after the 800 number call is completed to the second telecommunications platform.

8. The method of claim 1 wherein the predetermined telephone event comprises a predetermined time-out period following the end of a session with an information service provider.

9. The method of claim 1 wherein the predetermined telephone event comprises receipt of a predetermined signal from the calling party representing a request to return to the first telecommunications platform.

10. A method for use in an information services system which provides information to a subscriber in response to an information services request telephone call, the method comprising the steps of:

transferring the telephone call from a telecommunications platform to an information service provider's platform and including with the telephone call an identifier which uniquely identifies the telephone call;

returning the telephone call to the telecommunications platform after an occurrence of a predetermined telephone event; and using the identifier to continue processing of the telephone call at the telecommunications platform.

11. The method of claim 10 wherein the identifier comprises an automatic number identifier (ANI) of a telephone station from which the telephone call originates.

12. The method of claim 10 wherein the identifier comprises a special services telephone number or access code unique to a calling party.

13. The method of claim 12 wherein the identifier comprises the calling party's Easy Reach$^{SM}$ 700 number.

14. The method of claim 10 wherein the telecommunications platform comprises one of an interexchange carrier platform and a local exchange carrier platform.

15. The method of claim 10 wherein the predetermined telephone event comprises a predetermined time-out period following the end of a session with an information service provider.

16. The method of claim 10 wherein the predetermined telephone event comprises receipt of a predetermined signal from a calling party representing a request to return to the first telecommunications platform.

* * * * *